(12) United States Patent
Matilainen et al.

(10) Patent No.: US 12,240,581 B2
(45) Date of Patent: Mar. 4, 2025

(54) USER INTERFACE APPARATUS FOR CONTROLLING MARINE VESSEL

(71) Applicant: ABB Schweiz AG, Baden (CH)

(72) Inventors: Antti Matilainen, Helsinki (FI); Kalevi Tervo, Helsinki (FI); Santeri Vanhakartano, Helsinki (FI)

(73) Assignee: ABB Schweiz AG, Baden (CH)

( * ) Notice: Subject to any disclaimer, the term of this patent is extended or adjusted under 35 U.S.C. 154(b) by 630 days.

(21) Appl. No.: 17/593,784

(22) PCT Filed: Mar. 27, 2020

(86) PCT No.: PCT/EP2020/058727
§ 371 (c)(1),
(2) Date: Sep. 24, 2021

(87) PCT Pub. No.: WO2020/193756
PCT Pub. Date: Oct. 1, 2020

(65) Prior Publication Data
US 2022/0126971 A1  Apr. 28, 2022

(30) Foreign Application Priority Data
Mar. 28, 2019 (EP) .................................. 19165678

(51) Int. Cl.
*B63H 25/02* (2006.01)
*B63H 21/21* (2006.01)
(Continued)

(52) U.S. Cl.
CPC .......... *B63H 25/02* (2013.01); *B63H 21/213* (2013.01); *G05G 9/047* (2013.01); *G06F 3/016* (2013.01);
(Continued)

(58) Field of Classification Search
CPC ............................ B63H 25/02; B63H 21/213; B63H 2025/026; G05G 9/047; G05G 1/015;
(Continued)

(56) References Cited

U.S. PATENT DOCUMENTS

| 4,519,335 A | 5/1985 | Krautkremer |
| 9,827,811 B1 | 11/2017 | Mcnew et al. |

(Continued)

FOREIGN PATENT DOCUMENTS

| CA | 2574748 A1 | 7/2007 |
| CN | 106054884 A | 10/2016 |

(Continued)

OTHER PUBLICATIONS

"Remote Control System ABB Remote Control System Intelligent Maneuvering"; Published Nov. 1, 2013.
(Continued)

*Primary Examiner* — Aryan E Weisenfeld
*Assistant Examiner* — Shivam Sharma
(74) *Attorney, Agent, or Firm* — Whitmyer IP Group LLC (57) ABSTRACT

A user interface apparatus for controlling a marine vessel. The apparatus includes concentric positioned mechanical stick, block and ring for setting a control parameter, electric motors, and electric visual elements. The apparatus also includes one or more processors configured to operate the user interface apparatus in a plurality of operation modes, each operation mode with a distinct configuration, retrieve distinct settings for the tactile feedback and/or the visual feedback, and control the tactile feedback given by the one or more electric motors and/or the visual feedback given by the one or more electric visual elements based on the retrieved distinct settings during setting a selected control parameter mapped to the mechanical stick, block or ring.

18 Claims, 10 Drawing Sheets

(51) Int. Cl.
  *G05G 9/047* (2006.01)
  *G06F 3/01* (2006.01)
  *G06F 3/0362* (2013.01)
  *G06F 3/04847* (2022.01)
  *G05G 1/015* (2008.04)

(52) U.S. Cl.
  CPC ........ *G06F 3/0362* (2013.01); *G06F 3/04847* (2013.01); *B63H 2025/026* (2013.01); *G05G 1/015* (2013.01); *G05G 2009/04766* (2013.01); *G05G 2505/00* (2013.01)

(58) Field of Classification Search
  CPC ...... G05G 2009/04766; G05G 2505/00; G06F 3/016; G06F 3/0362; G06F 3/04847
  See application file for complete search history.

(56) References Cited

U.S. PATENT DOCUMENTS

| | | | |
|---|---|---|---|
| 10,000,268 B1 * | 6/2018 | Poirier | ............... H01H 25/04 |
| 2007/0279401 A1 | 12/2007 | Ramstein et al. | |
| 2010/0030411 A1 | 2/2010 | Wilson et al. | |
| 2011/0112771 A1 | 5/2011 | French | |
| 2011/0172858 A1 | 7/2011 | Gustin et al. | |

FOREIGN PATENT DOCUMENTS

| | | | | |
|---|---|---|---|---|
| EP | 3006327 | A1 | 4/2016 | |
| EP | 3048038 | A1 * | 7/2016 | ........... B63H 21/213 |
| EP | 3335978 | A1 | 6/2018 | |
| JP | 2003113729 | A | 4/2003 | |
| WO | WO 2011049470 | A1 * | 4/2011 | |
| WO | 2013174673 | A1 | 11/2013 | |

OTHER PUBLICATIONS

Wartsila "A New Design for Propulsion Control", Published: May 15, 2013; 13 Pages.

Lilaas "L01 Azimuth, Thruster and Propulsion Control" Published: Jan. 1, 2015: 3 Pages.

European Search Report Application No. 19165678.4; Completed: Aug. 30, 2019; Mailing Date: Sep. 6, 2019; 13 Pages.

PCT International Search Report and Written Opinion of the International Searching Authority; Application No. PCT/EP2020/058727: Completed: May 19, 2020; Mailing Date: May 29, 2020: 15 Pages.

Chinese Notice of Allowance and Search Report; Application No. 202080039059.5; Mailing Date: Aug. 31, 2023; 11 Pages.

* cited by examiner

USER INTERFACE APPARATUS FOR CONTROLLING MARINE VESSEL

TECHNICAL FIELD

Various example embodiments relate to a user interface apparatus for controlling a marine vessel.

BACKGROUND

Ship manoeuvring is a very demanding task for the mariner. The mariner must observe a multitude of various separate control apparatuses spread around the bridge of the ship.

SUMMARY

According to an aspect, there is provided subject matter of independent claims. Dependent claims define some example embodiments.

One or more examples of implementations are set forth in more detail in the accompanying drawings and the description of embodiments.

BRIEF DESCRIPTION OF THE DRAWINGS

Some example embodiments will now be described with reference to the accompanying drawings, in which.

DETAILED DESCRIPTION

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the example embodiments and in the claims, serve to illustrate the example embodiments with reference to the drawings, without limiting it to these examples only.

Figure 1A:
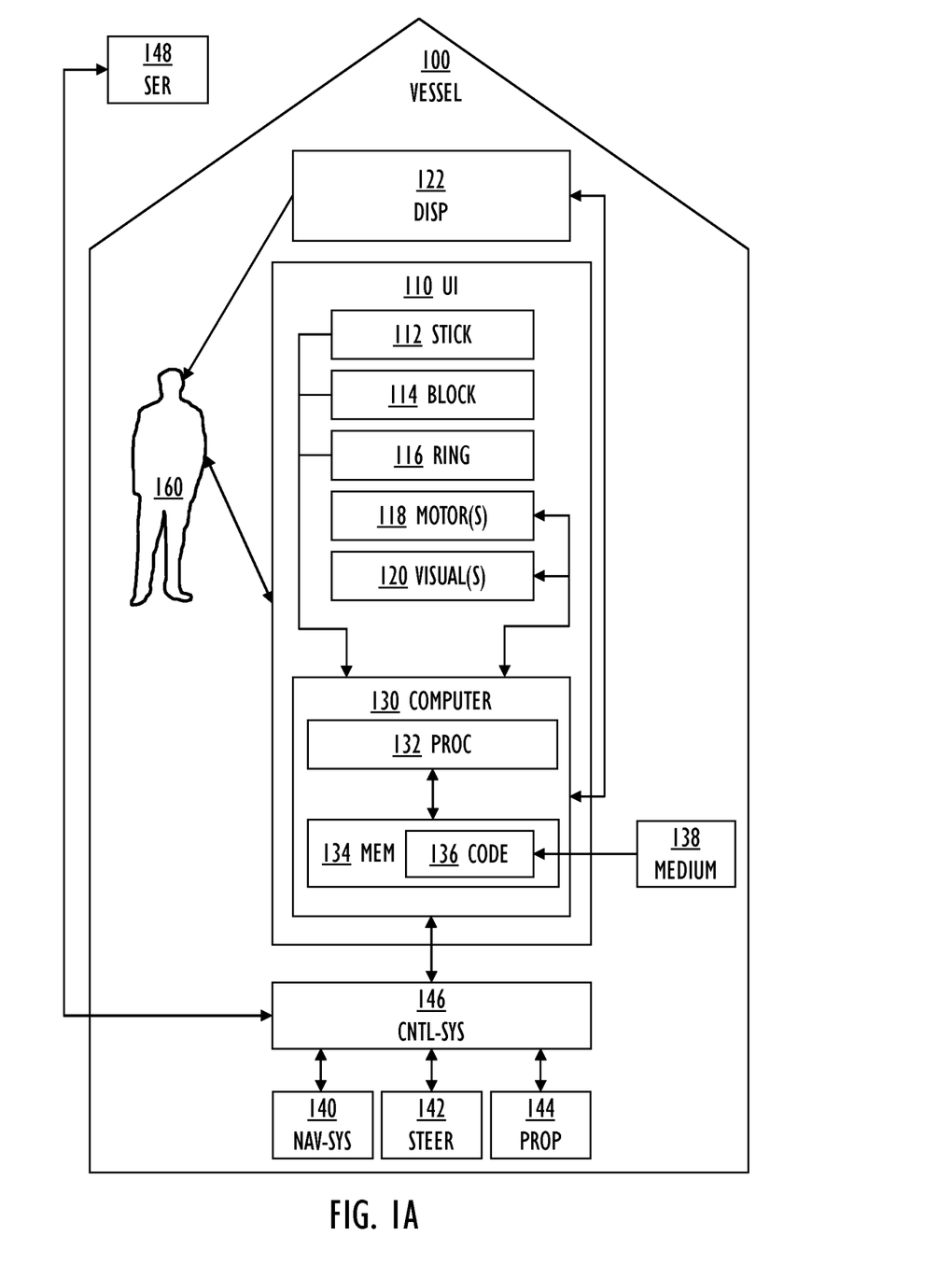
FIG. 1A and FIG. 1B illustrate example embodiments of a user interface apparatus.
Figure 1B:
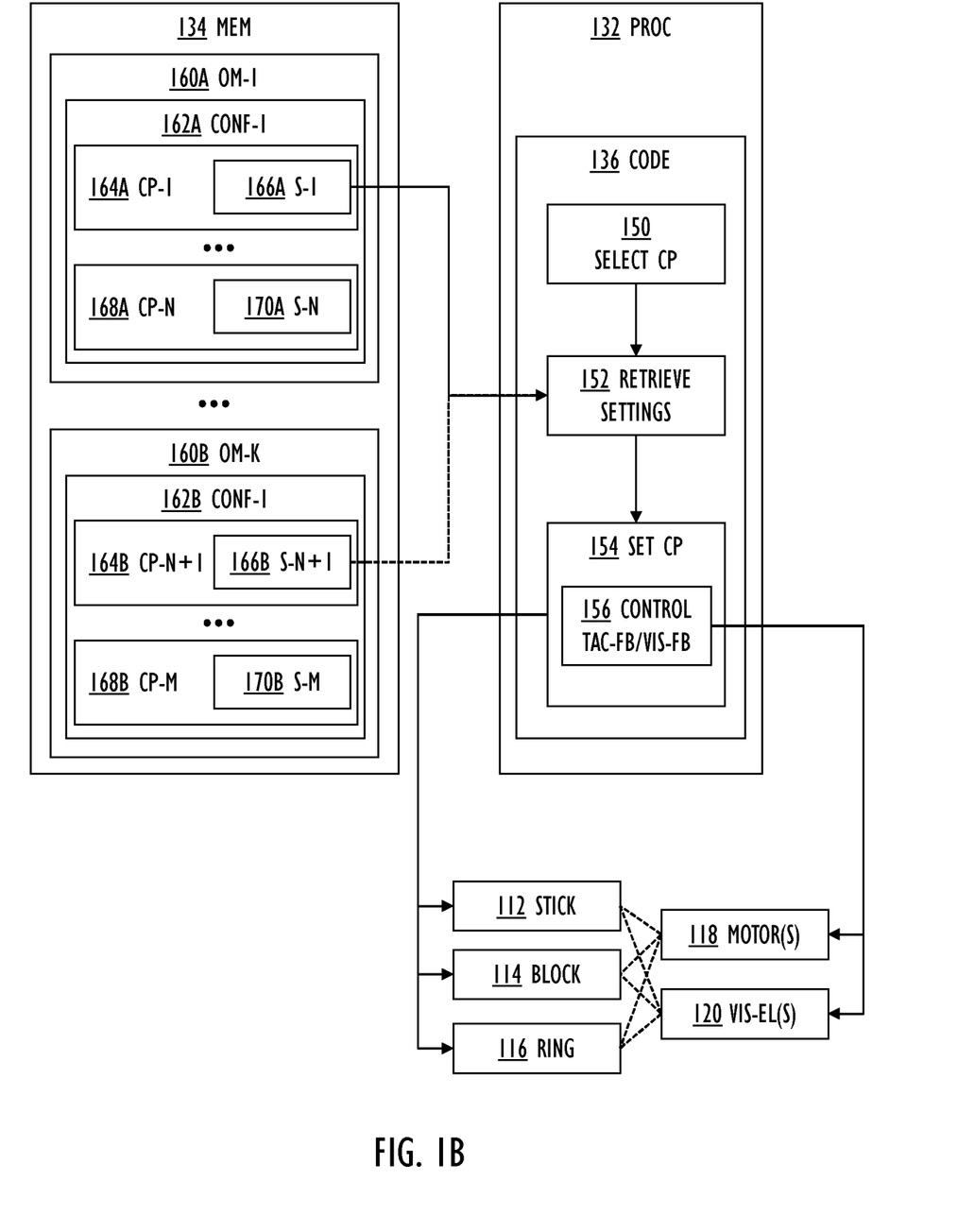

Let us first study FIG. 1A and FIG. 1B illustrating example embodiments of a user interface apparatus 110 for controlling a marine vessel 100 by a user 160.

The user 160 may be a mariner navigating the marine vessel 100 or assisting as a crewmember: a captain, a navigating officer, an officer, an officer of the watch, a helmsman, or other deck crew member, or even a pilot.

The user 160 may navigate the marine vessel 100 in real-time onboard, or the user 160 may be outside of the marine vessel 100, whereby the user 160 is able to remote control the marine vessel 100 (which may then an unmanned or autonomous ship). The manoeuvring may also be non-real-time meaning that the user 160 may plan tricky passages in advance before the actual passage.

The user interface apparatus 110 may be a stationary apparatus located in a bridge of the marine vessel 100, or the user interface apparatus 120 may also be a mobile computing device (such as placed on a mobile platform, like on a desk, for example).

The user interface apparatus 110 is for manoeuvring the marine vessel 100, and it may interact with numerous systems including a navigation system 140 (which may comprise an autopilot, a gyrocompass, a magnetic compass, inertial measurement units, a sensor fusion-based speedlog, a satellite positioning receiver of a Global Navigation Satellite System including GPS, Glonass, Galileo or Beidou, etc.), one or more displays 122, a steering system 142 configured to steer the marine vessel 100, and a propulsion system 144 configured to propel the marine vessel 100. The interaction may be through a control system 146 (which may be a bridge control system or a remote control system, or another system providing an integrated access to the various subsystems 140, 142, 144) as in FIG. 1A. Note that the marine vessel 100 may comprise numerous other systems (such as a radar system) not described here.

The steering system 142 and the propulsion system 144 may comprise many subsystems, and they may be integrated at least to some degree: diesel engines, electric motors, frequency converters, electric power sources, propellers, rudders, a stern thruster, a tunnel (or bow) thruster 422, active stabilizer fins, etc. In an example embodiment, the steering system 142 and the propulsion system 144 comprises one or more electric podded azimuth thrusters (such as Azipod®), which may be rotated full 360 degrees and operated in pulling and/or pushing operation modes.

The user interface apparatus 110 is configured to receive commands from a user 160, and the one or more displays 122 are configured to show data of the marine vessel 100 to the user 160.

The one or more displays 122 may be implemented with various technologies, such as projected on a window (like in a head-up display, see WO 2013/174673), as a stationary monitor, as a touchscreen 106, or as a part of a mobile platform, for example.

The user interface apparatus 110 comprises three mechanical elements configured to interact with a user 160: a mechanical stick 112, a mechanical block 114, and a mechanical ring 116.

The user interface apparatus 110 also comprises one or more processors 132 configured to control operations of the user interface apparatus 110.

The one or more processors 132 may be implemented with one or more microprocessors 132, and one or more memories 134 including computer program code 136. The one or more memories 134 and the computer program code 136 are configured to, with the one or more processors 132 cause performance of the data processing operations. The parts 132, 134, 136 may belong to one or more computers 130, or they may belong to specific hardware implementing driver firmware for the user interface apparatus 110, for example.

The term 'processor' 132 refers to a device that is capable of processing data. Depending on the processing power needed, the apparatus 110 may comprise several processors 132 such as parallel processors, a multicore processor, or a computing environment that simultaneously utilizes resources from several physical computer units (sometimes these are referred as cloud, fog or virtualized computing environments). When designing the implementation of the processor 132 a person skilled in the art will consider the requirements set for the size and power consumption of the apparatus 110, the necessary processing capacity, production costs, and production volumes, for example. The processor 132 and the memory 134 may be implemented by an electronic circuitry.

A non-exhaustive list of implementation techniques for the processor 132 and the memory 134 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' 134 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 136 may be implemented by software. In an example embodiment, the software may be written by a suitable programming language, and the resulting executable code may be stored in the memory 134 and run by the processor 132.

An example embodiment provides a computer-readable medium 138 storing computer program code 136, which, when loaded into the one or more processors 132 and executed by one or more processors 132, causes the one or more processors 132 to perform a computer-implemented method for controlling the user interface apparatus 110, which will be explained with reference to FIG. 1B. The computer-readable medium 138 may comprise at least the following: any entity or device capable of carrying the computer program code 136 to the one or more processors 132, a record medium, a computer memory, a read-only memory, an electrical carrier signal, a telecommunications signal, and a software distribution medium. In some jurisdictions, depending on the legislation and the patent practice, the computer-readable medium 138 may not be the telecommunications signal. In an example embodiment, the computer-readable medium 138 may be a computer-readable storage medium. In an example embodiment, the computer-readable medium 138 may be a non-transitory computer-readable storage medium.

Note that an external computer server, an on board server 146 (such as the control system) and/or an on shore server 148 may augment the processing: complicated calculations may be performed in the server 146, 148, the server may maintain navigational charts, the server may contain a virtual representation of the marine vessel 100, etc. The server 146, 148 may be a networked computer server, which interoperates with the one or more processors 132 according to a client-server architecture, a cloud computing architecture, a peer-to-peer system, or another applicable computing architecture.

To communicate with the on shore server 148, the user interface apparatus 110 may comprise a wireless transceiver, utilizing a suitable communication technology such as GSM, GPRS, EGPRS, WCDMA, UMTS, 3GPP, IMT, LTE, LTE-A, 2G/3G/4G/5G, etc. and/or a suitable non-cellular communication technology such as a proprietary/standard radio technology.

Some of the processing may also be provided by another system of the marine vessel 100. For example, the steering system 142 and the propulsion system 144 may pre-process the data related to its operation and offer an interface to exchange data with the one or more processors 132 of the user interface apparatus 110.

The communication couplings between various actors 110, 122, 140, 142, 144, 146, 148 may be implemented with appropriate wired/wireless communication technologies and standard/proprietary protocols. In an example embodiment, the wired communication is implemented with a suitable communication technology utilizing coaxial cable, twisted pair or fibre optic such as LAN (Local Area Network) or the Ethernet. In an example embodiment, the wireless communication is implemented with a suitable radio communication technology such as Bluetooth, Wi-Fi or WLAN (Wireless Local Area Network).

In FIG. 1B, the operations 150, 152, 154, 156 of the method for controlling the user interface apparatus 110 are not necessarily in a chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or a part of the operation. It should be noted that no special order of operations is required, except where necessary due to the logical requirements for the processing order.

The method starts after the one or more processors 132 are switched on, and continues until a reset or a switch off of the one or more processors 132.

As a prerequisite for the method, the mechanical stick 112 is configured to set-a 154 a control parameter by a linear motion, the mechanical block 114 is configured to set 154 a control parameter by a rotational motion, and the mechanical ring 116 is configured to set 154 a control parameter by a rotational motion. Furthermore, one or more electric motors 118 are configured to give tactile feedback related to setting 154 a control parameter, and one or more electric visual elements 120 are configured to give visual feedback related to setting 154 a control parameter.

In 150, the one or more processors 132 are configured to select a control parameter from among two or more control parameters 164A, 168A, 164B, 168B. The selection 150 may be made by a user interface operation, such as the user 160 pressing a button (located in the same place as an illumination 200) on the end of the mechanical stick 112. Alternatively, or additionally, the selection 150 may be automatic, such as made by the processor 132 or the control system 146 to fit the navigation circumstances (such as speed and/or location) of the marine vessel 100.

In 152, the one or more processors 132 are configured to retrieve distinct settings 166A/170A/166B/170B for the tactile feedback and/or the visual feedback based on the selected control parameter.

In 156, the one or more processors 132 are configured to control the tactile feedback given by the one or more electric motors 118 and/or the visual feedback given by the one or more electric visual elements 120 during setting the selected control parameter in 154. As shown in the drawings, both the tactile feedback and the visual feedback are in general given, but for a certain control parameter in a certain operating situation only visual feedback or tactile feedback may be given.

Using this sequence comprising four operations 150-152-154-156, the functioning of the user interface apparatus 110 may be controlled. As the control parameter may be selected from a plurality of control parameters, the user interface apparatus 110 may offer an integrated control approach: the distinct tactile (or haptic force) and visual feedback settings enable setting different control parameters with the same mechanical elements 112, 114, 116. This is useful when navigating as the mariner 160 may then concentrate on using the single user interface apparatus 110 and the one or more displays 122, instead of having to observe and use a multitude of various separate control apparatuses spread around the bridge of the ship 100. The single user interface apparatus 110 makes it easier to sense the cause and impact of the control commands given by the user 160 and hence improve the situational awareness. The user interface apparatus 110 may be used in different kinds of marine vessels and for different operation situations such as auto pilot, open sea, manoeuvring, fairway, docking, etc. Besides tactile and visual feedback, also audio feedback may be controlled and given by the user interface apparatus 110.

By using the user interface apparatus 110, the mariner 160 may adjust the control parameters, which may then be inputted to the steering system 142 and the propulsion system 144. The control parameters may comprise operation parameters of the steering system 142 and the propulsion system 144, including, but not limited to a rudder angle, a propeller angle, a propeller speed, a propeller torque, a propeller power, a propeller pitch, a propeller thrust, an azimuth thruster angle, an azimuth thruster speed, an azimuth thruster torque, an azimuth thruster power, an azimuth thruster pitch, an azimuth thruster thrust, an electric podded azimuth thruster angle, an electric podded azimuth thruster speed, an electric podded azimuth thruster torque, an electric podded azimuth thruster power, an electric podded azimuth thruster pitch, an electric podded azimuth thruster thrust, etc.

In an example embodiment, the one or more processors 132 are configured to maintain two or more of the following control parameters for the mechanical stick 112: a ship speed, a thrust force, a propeller speed, a propeller pitch, a power output.

In an example embodiment, the one or more processors 132 are configured to maintain two or more of the following control parameters for the mechanical block 114: a direction of a thrust force, a steering angle.

In an example embodiment, the one or more processors 132 are configured to maintain two or more of the following control parameters for the mechanical ring 116: a heading, a course, a torque, a rate of turn, a steering angle.

Figure 2:
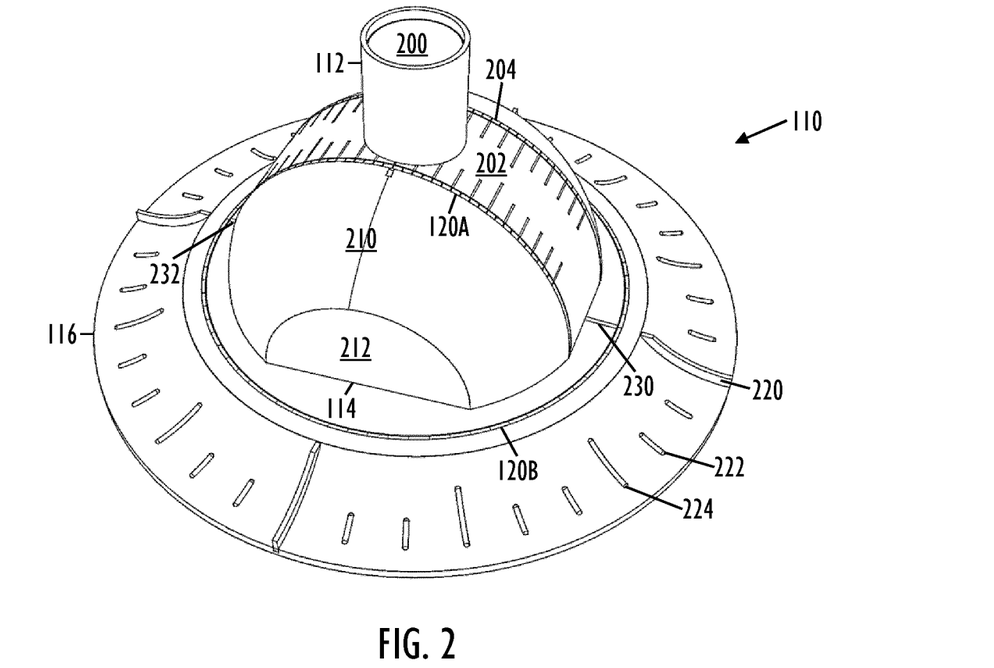
FIG. 2 and FIG. 3 illustrate further example embodiments of the user interface apparatus.

FIG. 2 illustrates an example embodiment of the user interface apparatus 110, wherein the mechanical stick 112, the mechanical block 114, and the mechanical ring 116 are configured and positioned concentric. This may offer the advantage that the user 160 intuitively knows the relations of the various control parameters as they are in the same space: the neutral position of the mechanical stick 112 is in a dead centre, and the mechanical block 114 and the mechanical ring 116 rotate around the dead centre. Such an integrated solution may also save space. In an example embodiment, the mechanical stick 112 and the mechanical block 114 are configured to adjust control parameters from the point of view of the center (such as a control point or a center of rotation) of the marine vessel 100, whereas the mechanical ring 116 is configured to adjust control parameters around the center of the marine vessel 100.

FIG. 2 also illustrates an example embodiment, wherein the mechanical stick 112 is configured and positioned to move along the linear motion across the mechanical block 114. The mechanical block 114 may comprise an external dome shape 210 (see also FIG. 3: 210A, 210B). In addition, the dome shape 210 may be truncated, i.e., it may have vertical sides 212 (see also FIG. 3: 212A, 212B). The mechanical stick 112 may have a base 202 with a graded scale 204 moving in unison with the mechanical stick along the surface of the dome shape 210 (or the base 202 may move in a hollow of the dome shape 202).

Figure 3:
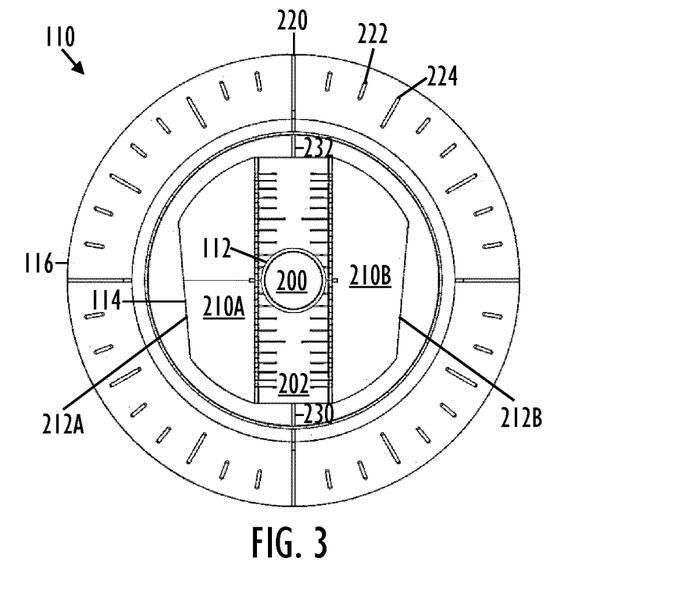

In the example embodiment of FIG. 2 and FIG. 3, the mechanical ring 116 is configured and positioned to surround the mechanical block 114. An advantage of using the mechanical ring 116 is that its manipulation with a great accuracy is possible: the user 160 may rotate the mechanical ring 116 with precision and also observe the amount of rotation easily. In an example embodiment, the rate of adjustment may be changeable. For example, in a default configuration, one full turn of the mechanical ring 116 is equivalent to an adjustment of 360 degrees, whereas in a special configuration, one full turn only adjusts 36 degrees, i.e., ten full turns being equivalent to the adjustment of 360 degrees.

As shown in FIG. 2 and FIG. 3, the mechanical ring 116 may be provided with a graded scale: large ridges 220 dividing the mechanical ring into four 90 degrees sectors, smaller ridges 224 denoting 30 degrees, and smallest ridges 222 denoting 10 degrees.

Figure 4:
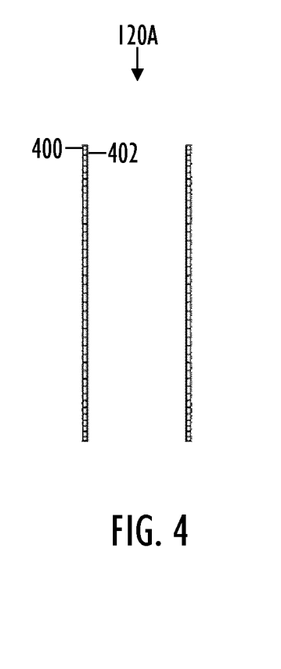
FIG. 4 and FIG. 5 illustrate example embodiment of electric visual elements.
Figure 5:
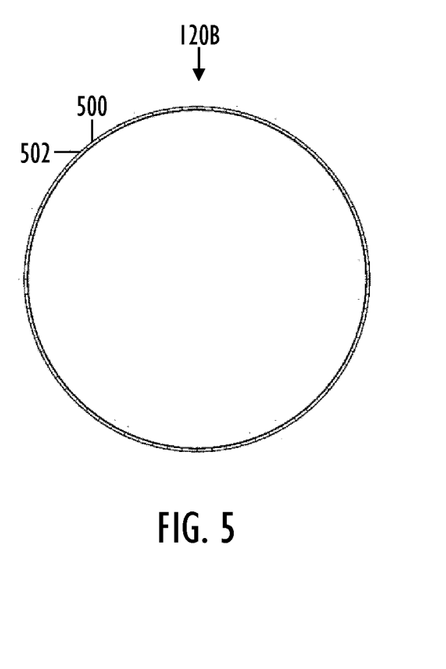

In an example embodiment, the one or more visual elements 120, 120A, 120B comprise a plurality of leds configured to give the visual feedback for the selected control parameter as one or more of an allowed range, a current setting, a new setting. FIG. 4 illustrates the visual element 120A with leds 400, 402 placed on both sides of the trajectory of the mechanical stick 112. Alternatively, a graded scale of the base 202 of the mechanical stick 112 may comprise visual elements such as an illumination. FIG. 5 illustrates the visual element 120B with leds 500, 502 placed around the mechanical block 114. As shown in FIG. 2 and FIG. 3, the one or more visual elements may also comprise an illumination 200 (with a led, for example) in the end of the mechanical stick 112. Other illumination may also be present, such as illuminated sections 230, 232 (with leds, for example).

In an example embodiment, the one or more electric motors 118 are configured to give the tactile feedback for the selected control parameter as one or more of detents, varying degrees of friction, restraints. The combined tactile and visual feedback of the single user interface apparatus 110 improves the situational awareness, because the feedback indicates both reference and actual impact of the command so that the immediate indication of the impact does not need to be observed from scattered user interfaces.

Figure 6A:
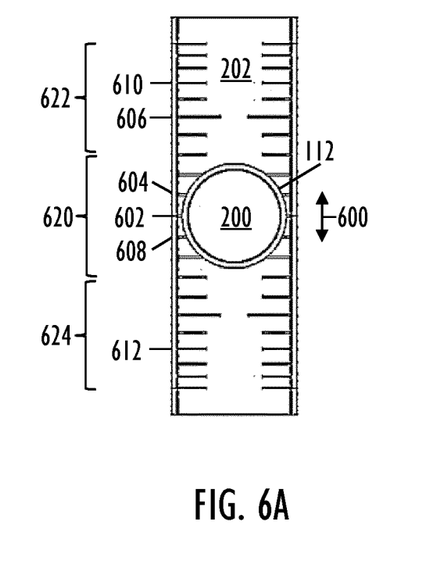
FIG. 6A and FIG. 6B illustrate example embodiments of a mechanical stick.
Figure 6B:
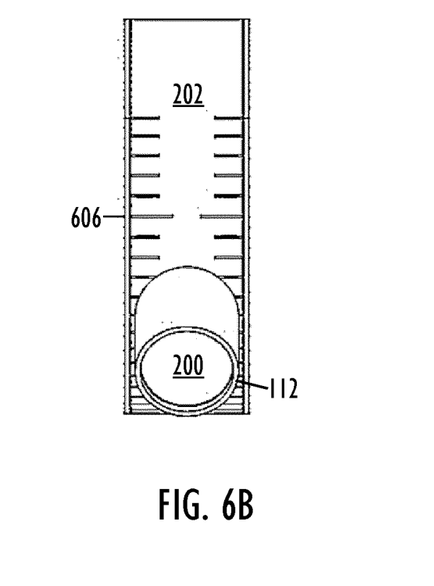

FIG. 6A and FIG. 6B illustrate an example embodiment of such tactile feedback given while operating the mechanical stick 112.

In FIG. 6A, the mechanical stick 112 is in the neutral position, and a detent 602 is felt when trying to move the mechanical stick 112 in the linear motion direction 600. The detent 602 feels like an inertia, i.e., the mechanical stick 112 tries to remain in the neutral position.

However, as the force exerted by the user 160 to the mechanical stick 112 overcomes the inertia, the mechanical stick 112 starts to move. As shown in FIG. 6A, there are ten further detents 604, 606, 608 both for forward and reverse.

In FIG. 6B, the user 160 has pulled the mechanical stick 112 to reverse with 50% power, as shown by an index at the detent 606.

FIG. 6A shows an example embodiment of restraints 610, 612: the power may only be 7/10=70% of the available power. The restraint 610, 612 feels like a stop, i.e., the mechanical stick 112 cannot be moved past the stop.

FIG. 6A also show an example embodiment of varying degrees of friction: when the mechanical stick 112 is moved in the region 620, a lighter friction is felt, whereas when the mechanical stick 112 is moved in either region 622 or 624, a harder friction is felt. This way, the user 160 may move the mechanical stick 112 within the power range of 30% forward or reverse lighter than in the remaining maximum power range of 70% forward or reverse.

In addition, the one or more electric motors 118 may also give tactile feedback as a spring force: if the user 160 exceeds an allowed range or limit, the one or more electric motors 118 are configured to bounce the mechanical element 112/114/116 back to an allowed range or back to the limit.

In an example embodiment illustrated in FIG. 1B, the one or more processors 132 are configured to operate the user interface apparatus in a plurality of operation modes 160A, 160B, and retrieve 152 the distinct settings as a part of a distinct configuration 162A, 162B of an operation mode 160A, 160B. The distinct configuration 162A, 162B maps the selected control parameter to one of the mechanical stick 112, the mechanical block 114, and the mechanical ring 116.

As shown in FIG. 1B, in an example embodiment, there may be number N control parameters 164A, 168A with distinct settings 166A, 170A in the first distinct configuration 162A of the first operation mode 160A, and M-N control parameters 164B, 168B with distinct settings 166B, 170B in the K:th distinct configuration 162B 315 of the of the K:th operation mode 160B. N, M and K are positive integers greater than one. The distinct settings 166A, 170A, 166B, 170B may be stored in the memory 134, or they may be stored in the server 146, 148, or they may even be hardcoded as parameters in the computer program code 136 or its configuration file.

In the following, some example embodiments of various operation modes are explained. Combined operation modes are also feasible, such as keeping heading constant and controlling the speed (surge and sway) with the mechanical stick 112, and all other combinations of position, heading, speed, and rate of turn controlling with the other elements 114, 116.

Figure 7A:
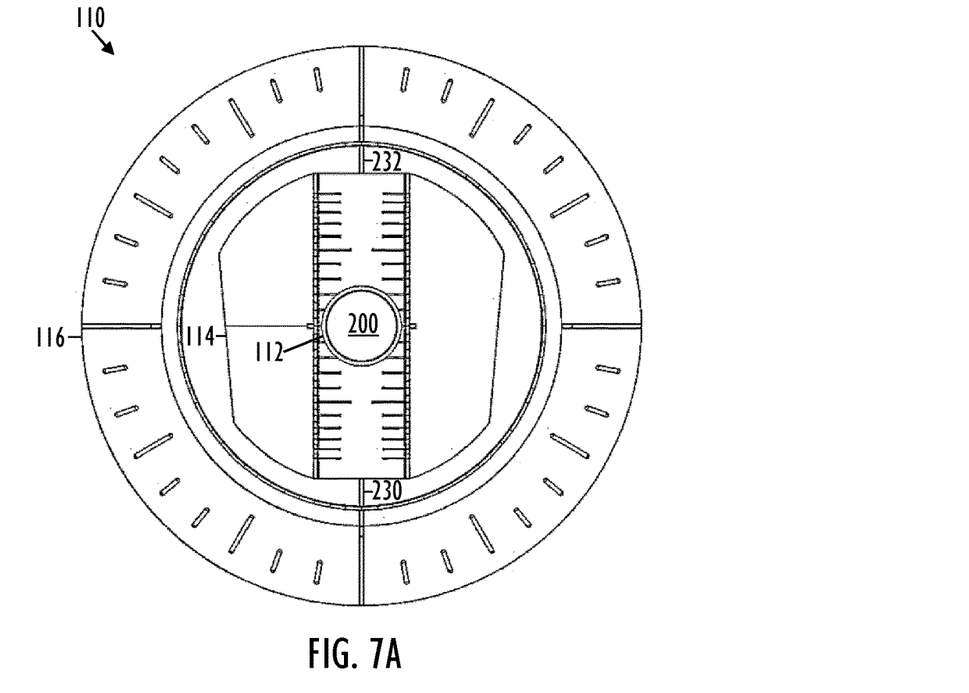
FIG. 7A, 7B, FIG. 8A, FIG. 8B, FIG. 9A, FIG. 9B, FIG. 10A, FIG. 10B, FIG. 11A, FIG. 11B and FIG. 11C illustrate example embodiments of setting various control parameters with the user interface apparatus.
Figure 7B:
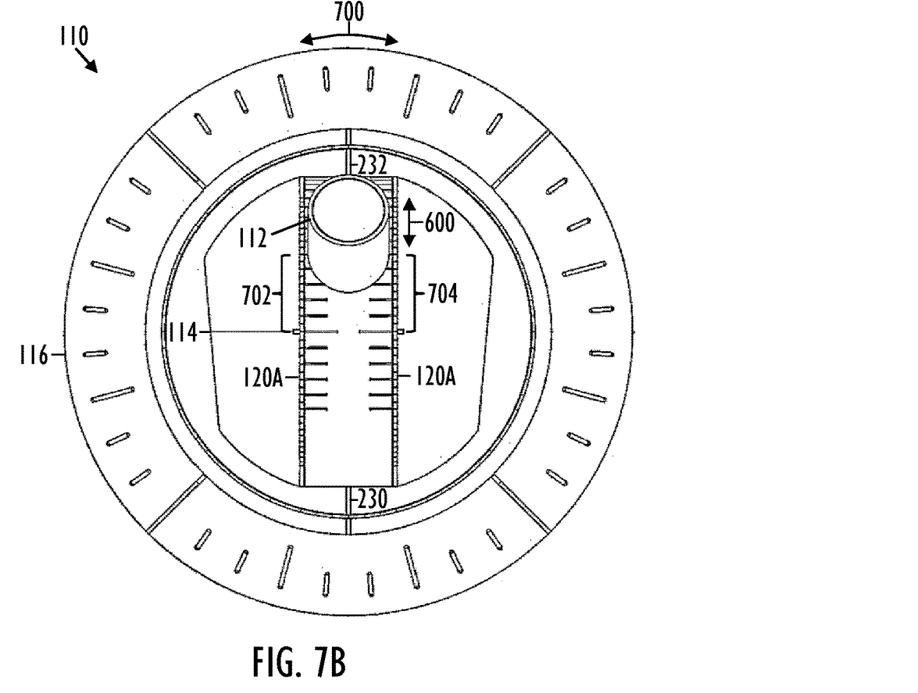

In an example embodiment illustrated in FIG. 7A and FIG. 7B, the one or more processors 132 are configured to operate the user interface apparatus in an auto pilot control mode, wherein the one or more processors 132 are configured to maintain a control parameter settable 154 with the mechanical stick 112 related to a ship speed, disable the mechanical block 114, and maintain control parameters settable 154 with the mechanical ring 116 related to one or more of a heading, a course. In FIG. 7A, the illuminations 200, 230, 232 indicate to the user 160 that the auto pilot control mode is on. In FIG. 7B, the user 160 has intervened and set manually the speed control to 50% forward with the mechanical stick 112 as indicated with the illuminated leds 702, 704, and the mechanical ring 116 may also be rotated 700 clockwise or anticlockwise to set the heading/course. Alternatively, FIG. 7B illustrates that in the auto pilot control mode, the present setting of the speed control may be shown, and also the heading/course. This is achieved by moving the mechanical stick 112 and the mechanical ring 116 to appropriate positions with the one or more electric motors 118.

Figure 8A:
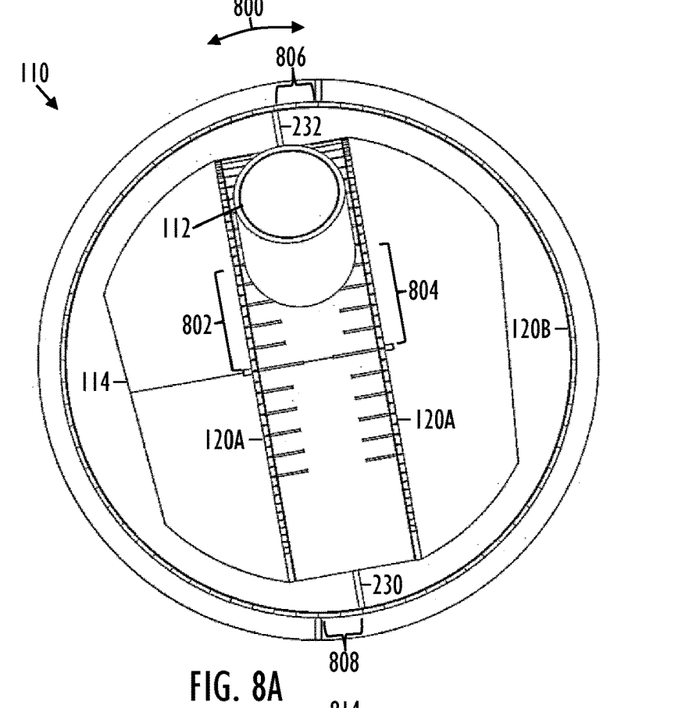
Figure 8B:
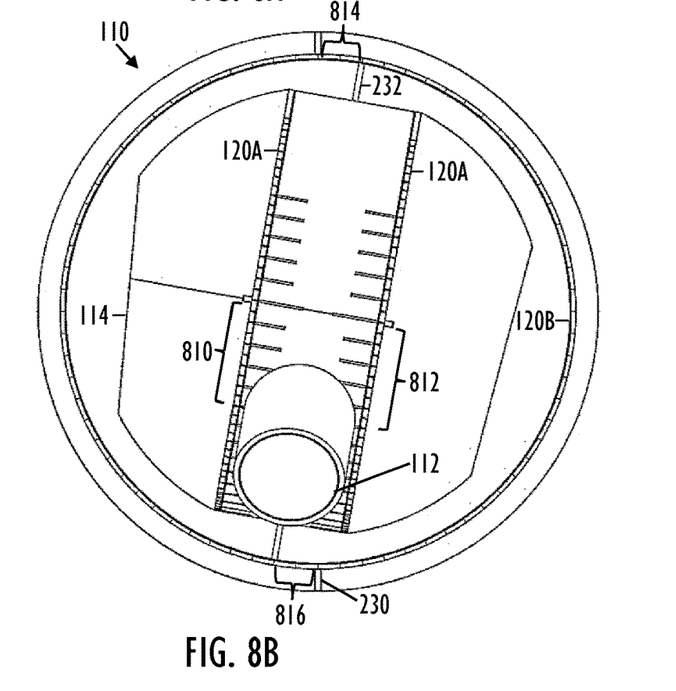

In an example embodiment illustrated in FIG. 8A and FIG. 8B, the one or more processors 132 are configured to operate the user interface apparatus in an azimuth lever mode, wherein the one or more processors 132 are configured to maintain control parameters settable 154 with the mechanical stick 112 related to one or more of a thrust force, a propeller speed, maintain a control parameter settable 154 with the mechanical block 114 related to a direction of a thrust force, and disable the mechanical ring 116. In FIG. 8A, the propeller speed is set to 50% forward of the maximum rotations per minute with the mechanical stick 112 as indicated with the illuminated leds 802, 804, and the angle 800 of the azimuthing propulsion units is set to 10 degrees in the port side direction with the mechanical block 114 as indicated with the illuminated leds 806, 808. In FIG. 8B, the propeller speed is set to 50% reverse of the maximum rotations per minute with the mechanical stick 112 as indicated with the illuminated leds 810, 812, and the angle of the azimuthing propulsion units is set to 10 degrees in the starboard side direction with the mechanical block 114 as indicated with the illuminated leds 814, 816.

Figure 9A:
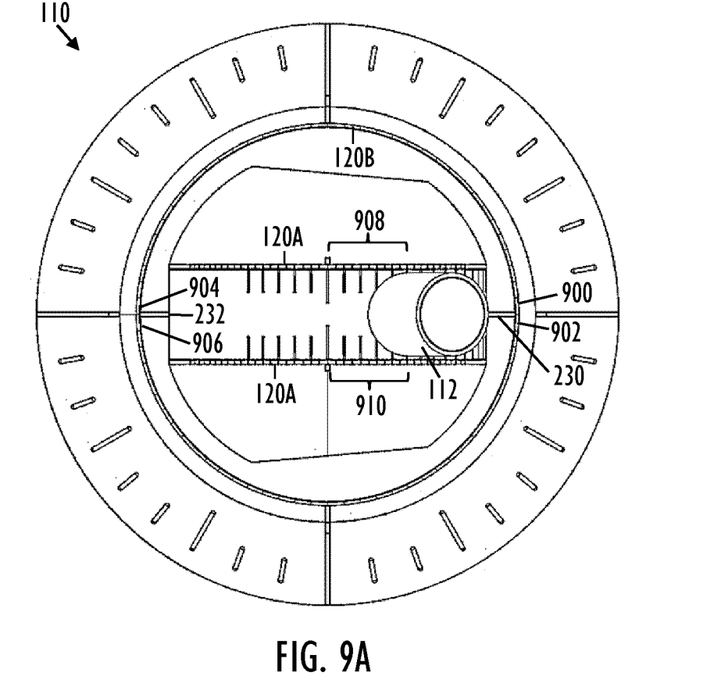
Figure 9B:
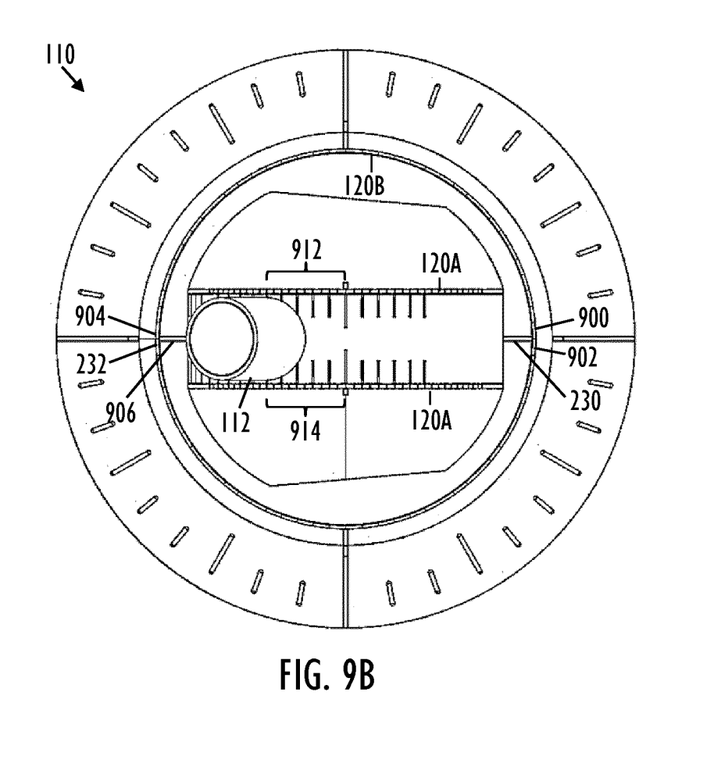

In an example embodiment illustrated in FIG. 9A and FIG. 9B, the one or more processors 132 are configured to operate the user interface apparatus in a bow thruster mode (or bow/stern thruster mode, or any fixed direction thruster mode), wherein the one or more processors 132 are configured to maintain control parameters settable 154 with the mechanical stick 112 related to one or more of a thrust, a speed, disable the mechanical block 114, and disable the mechanical ring 116. In FIG. 9A, the speed is set to 50% in the port side direction with the mechanical stick 112 as indicated with the illuminated leds 230, 232, 900, 902, 904, 906, 908, 910. In FIG. 9B, the speed is set to 50% in the starboard side direction with the mechanical stick 112 as indicated with the illuminated leds 230, 232, 900, 902, 904, 906, 912, 914.

Figure 10A:
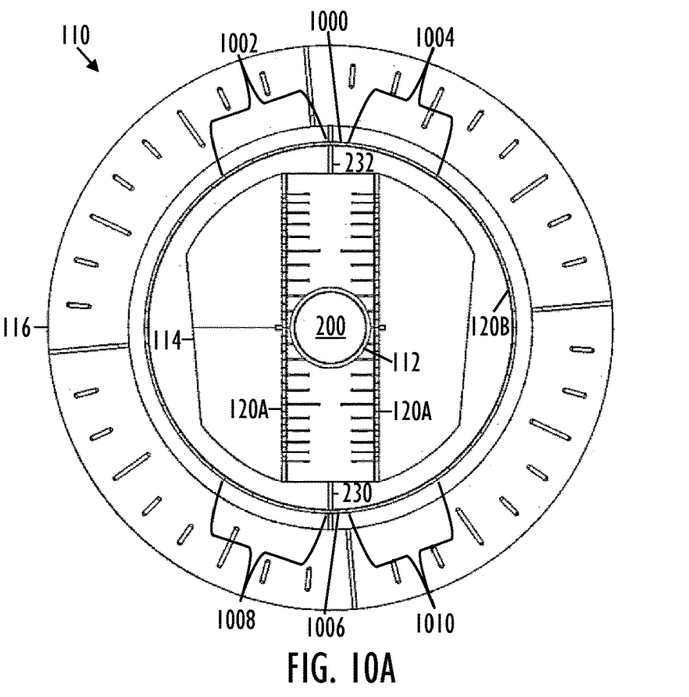
Figure 10B:
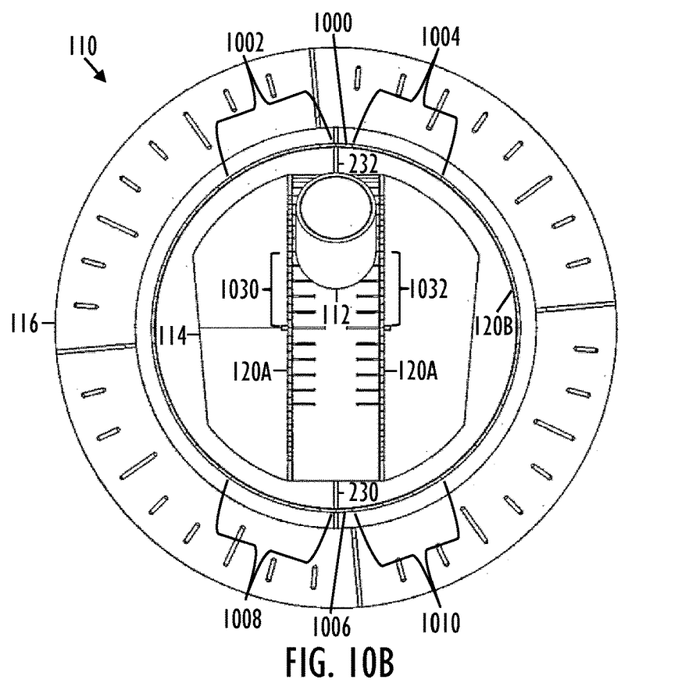

In an example embodiment illustrated in FIG. 10A and FIG. 10B, the one or more processors 132 are configured to operate the user interface apparatus in a mini wheel mode, wherein the one or more processors 132 are configured to maintain control parameters settable 154 with the mechanical stick 112 related to one or more of a ship speed, a propeller speed, disable the mechanical block 114, and maintain a control parameter settable 154 with the mechanical ring 116 related to a steering angle. In FIG. 10A, the steering angle is set to 5 degrees in the starboard side direction with the mechanical block 114 as indicated with the illuminated leds 230, 232, 1000, 1002, 1004, 1006, 1008, 1010. In FIG. 10B, in addition to the setting of the FIG. 10A, the propeller speed is set to 50% forward with the mechanical stick 112 as indicated with the further illuminated leds 1030, 1032.

Figure 11A:
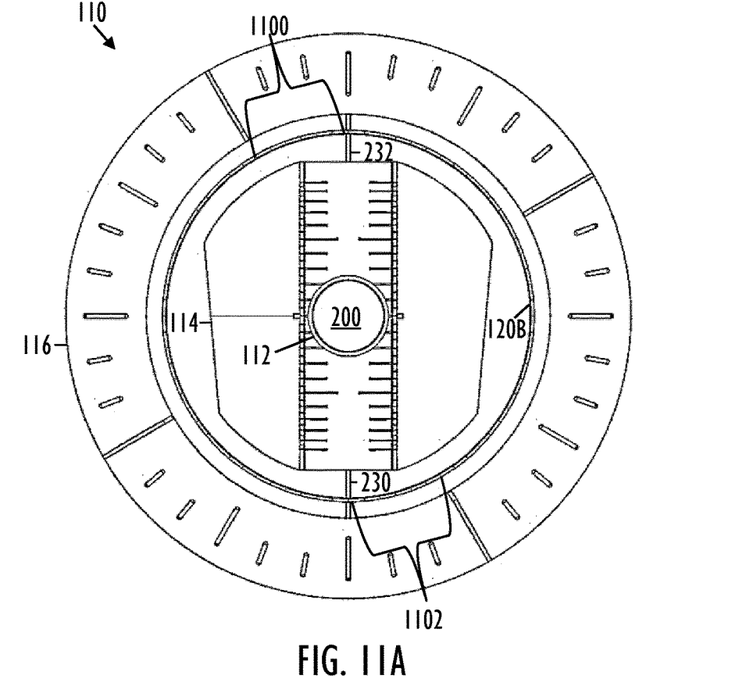
Figure 11B:
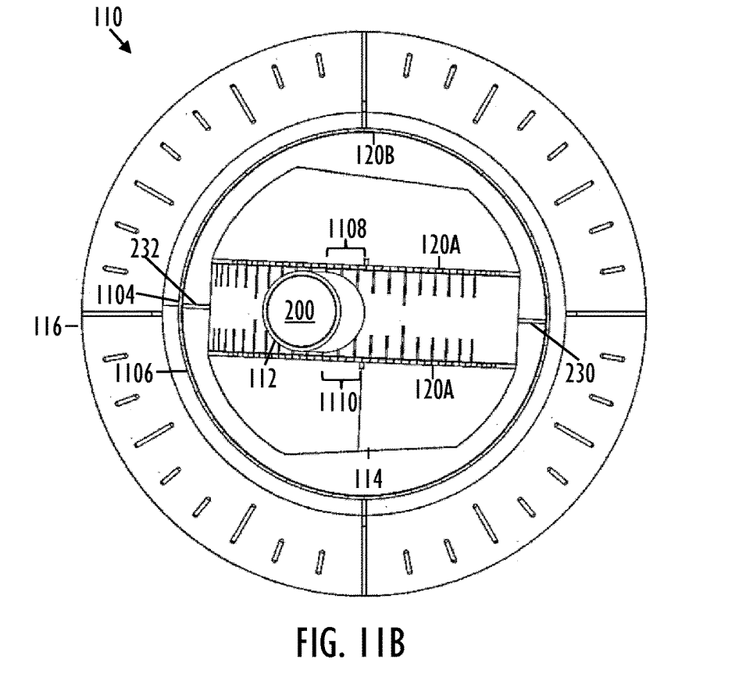
Figure 11C:
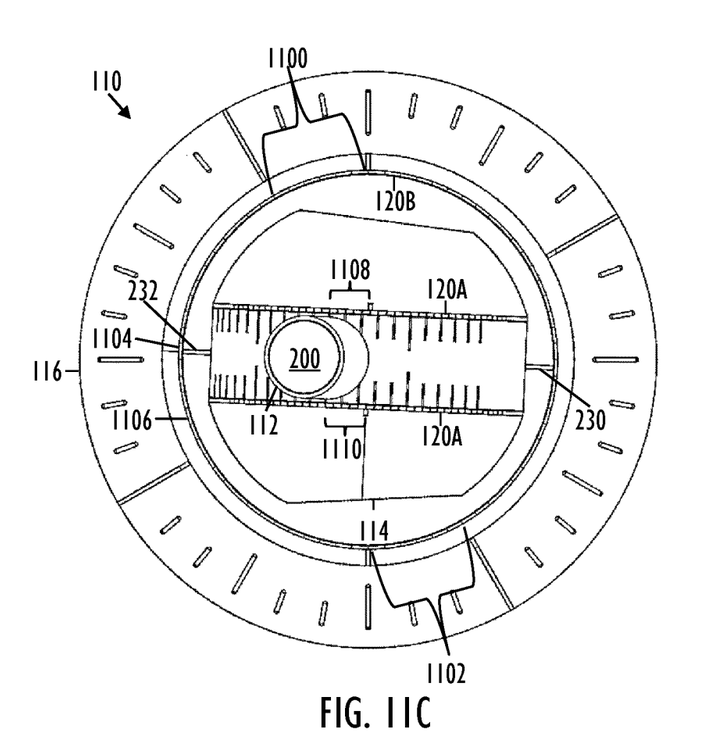

In an example embodiment illustrated in FIG. 11A, FIG. 11B and FIG. 11C, the one or more processors 132 are configured to operate the user interface apparatus in a joystick mode, wherein the one or more processors 132 are configured to maintain control parameters settable 154 with the mechanical stick 112 related to one or more of a ship speed, a thrust force, a power, maintain a control parameter settable 154 with the mechanical block 114 related to a direction of a thrust force, and maintain control parameters settable 154 with the mechanical ring 116 related to one or more of a torque, a rate of turn. In FIG. 11A, the rate of turn per minutes is 30 degrees as indicated with the illuminated leds 1100, 1102. In FIG. 11B, the thrust force is set to 25% forward with the mechanical stick 112 as indicated with the illuminated leds 200, 230, 232, 1108, 1110, and the set point is set with the mechanical block 114 to the direction indicated with the illuminated led 1104, whereas the actual movement direction is indicated with the illuminated led 1106. After the setting in FIG. 11B, the following situation is shown in FIG. 11C, which shows the settings 230, 232, 1104, 1108, 1110, the actual movement direction 1106, and the rate of turn 1100, 1102.

Even though the invention has been described with reference to one or more example embodiments according to the accompanying drawings, it is clear that the invention is not restricted thereto but can be modified in several ways within the scope of the appended claims. All words and expressions should be interpreted broadly, and they are intended to illustrate, not to restrict, the example embodiments. It will be obvious to a person skilled in the art that, as technology advances, the inventive concept can be implemented in various ways.

The invention claimed is:

1. A user interface apparatus for controlling a marine vessel, comprising:
    a mechanical stick with a linear motion, a mechanical block with a rotational motion, and a mechanical ring with a rotational motion, all of which are manipulatable by a user, wherein the mechanical block and the mechanical ring are concentric with each other, wherein the mechanical stick in one position of a plurality of positions is concentric with the mechanical block and the mechanical ring;
    one or more electric motors configured to give tactile feedback to the user; and
    one or more processors configured to:
        operate the user interface apparatus in a plurality of operation modes, each operation mode with a distinct configuration that:
            maps one of a ship speed, a thrust force, a propeller speed, a propeller pitch, or a power output as a control parameter for the mechanical stick,
            disables the mechanical block or maps one of a direction of a thrust force or a steering angle as a control parameter for the mechanical block, and
            disables the mechanical ring, or maps one of a heading, a course, a torque, or a rate of turn as a control parameter for the mechanical ring, or maps a steering angle as a control parameter for the mechanical ring when the steering angle is not mapped to the mechanical block;
        retrieve distinct settings for the tactile feedback as a part of the distinct configuration of the operation mode; and
        control the tactile feedback given by the one or more electric motors based on the retrieved distinct settings during setting a selected control parameter mapped to the mechanical stick, the mechanical block or the mechanical ring, wherein an integrated control approach is provided such that the distinct tactile and/or visual feedback settings enable setting different control parameters with the same mechanical stick, the mechanical block, and the mechanical ring in the plurality of the operation modes.

2. The apparatus of claim 1, wherein the mechanical stick is configured and positioned to move along the linear motion across the mechanical block, and the mechanical block includes an external dome shape.

3. The apparatus of claim 1, wherein the mechanical ring is configured and positioned to surround the mechanical block.

4. The apparatus of claim 1, further comprising one or more electric visual elements configured to give visual feedback to the user, wherein the one or more processors are configured to:
    retrieve distinct settings for the visual feedback as a part of the distinct configuration of the operation mode; and
    control the visual feedback given by the one or more electric visual elements based on the retrieved distinct settings during setting the selected control parameter mapped to the mechanical stick, the mechanical block or the mechanical ring, wherein the integrated control approach is provided such that the distinct visual feedback settings enable setting different control parameters with the same mechanical stick, the mechanical block, and the mechanical ring in the plurality of the operation modes.

5. The apparatus of claim 1, wherein the one or more electric motors are configured to give the tactile feedback for the selected control parameter as detents and/or varying degrees of friction during the setting of the selected control parameter, and/or as restraints indicating an allowed range of the selected control parameter.

6. The apparatus of claim 1, wherein the one or more processors are configured to operate the user interface apparatus in an auto pilot control mode selected from the plurality of the operation modes, wherein the one or more processors are configured to maintain the selected control parameter settable with the mechanical stick related to the ship speed, disable the mechanical block, and maintain the selected control parameter settable with the mechanical ring related to the heading or the course.

7. The apparatus of claim 1, wherein the one or more processors are configured to operate the user interface apparatus in an azimuth lever mode selected from the plurality of the operation modes, wherein the one or more processors are configured to maintain the selected control parameter settable with the mechanical stick related to the thrust force or the propeller speed, maintain the selected control parameter settable with the mechanical block related to the direction of the thrust force, and disable the mechanical ring.

8. The apparatus of claim 1, wherein the one or more processors are configured to operate the user interface apparatus in a bow thruster mode selected from the plurality of the operation modes, wherein the one or more processors are configured to maintain the selected control parameter settable with the mechanical stick related to the thrust or the speed, disable the mechanical block, and disable the mechanical ring.

9. The apparatus of claim 1, wherein the one or more processors are configured to operate the user interface apparatus in a mini wheel mode selected from the plurality of the operation modes, wherein the one or more processors are configured to maintain the selected control parameter settable with the mechanical stick related to the ship speed or the propeller speed, disable the mechanical block, and maintain the selected control parameter settable with the mechanical ring related to the steering angle.

10. The apparatus of claim 1, wherein the one or more processors are configured to operate the user interface apparatus in a joystick mode selected from the plurality of the operation modes, wherein the one or more processors are configured to maintain the selected control parameter settable with the mechanical stick related to the ship speed, the thrust force or the power, maintain the selected control parameter settable with the mechanical block related to the direction of the thrust force, and maintain the selected control parameter settable with the mechanical ring related to the torque or the rate of turn.

11. The apparatus of claim 1, wherein a first operation mode comprises a first configuration of control parameters for the steering system and the propulsion system, and a second operation mode includes a second configuration of control parameters for the steering system and the propulsion system, and the first configuration and the second configuration including a different set of control parameters.

12. The apparatus of claim 1, wherein the plurality of the operation modes includes a first operation mode with control parameters for one or more azimuthing propulsion units of a propulsion system of the marine vessel, and a second operation mode with control parameters for one or more fixed direction propulsion units of the propulsion system of the marine vessel.

13. The apparatus of claim 1, wherein a rate of change of the selected same control parameter is different between a first operation mode and a second operation mode.

14. The apparatus of claim 2, wherein the mechanical ring is configured and positioned to surround the mechanical block.

15. The apparatus of claim 2, wherein the one or more electric motors are configured to give the tactile feedback for the selected control parameter as detents and/or varying degrees of friction during the setting of the selected control parameter, and/or as restraints indicating an allowed range of the selected control parameter.

16. The apparatus of claim 2, wherein the one or more processors are configured to operate the user interface apparatus in an auto pilot control mode selected from the plurality of the operation modes, wherein the one or more processors are configured to maintain the selected control parameter settable with the mechanical stick related to the ship speed, disable the mechanical block, and maintain the selected control parameter settable with the mechanical ring related to the heading or the course.

17. The apparatus of claim 2, wherein the one or more processors are configured to operate the user interface apparatus in an azimuth lever mode selected from the plurality of the operation modes, wherein the one or more processors are configured to maintain the selected control parameter settable with the mechanical stick related to the thrust force or the propeller speed, maintain the selected control parameter settable with the mechanical block related to the direction of the thrust force, and disable the mechanical ring.

18. The apparatus of claim 4, wherein the one or more visual elements include a plurality of leds configured to give the visual feedback for the selected control parameter as one or more of an allowed range, a current setting, and a new setting.

\* \* \* \* \*